(12) United States Patent
Loftus

(10) Patent No.: US 11,810,573 B2
(45) Date of Patent: Nov. 7, 2023

(54) ASSISTED SPEECH RECOGNITION

(71) Applicant: Comcast Cable Communications, LLC, Philadelphia, PA (US)

(72) Inventor: Daniel Loftus, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 90 days.

(21) Appl. No.: 17/239,349

(22) Filed: Apr. 23, 2021

(65) Prior Publication Data

US 2022/0343916 A1    Oct. 27, 2022

(51) Int. Cl.
*G10L 15/00* (2013.01)
*G10L 15/30* (2013.01)
*G10L 15/22* (2006.01)
*G10L 15/08* (2006.01)

(52) U.S. Cl.
CPC .............. *G10L 15/30* (2013.01); *G10L 15/22* (2013.01); *G10L 15/08* (2013.01); *G10L 2015/228* (2013.01)

(58) Field of Classification Search
CPC combination set(s) only.
See application file for complete search history.

(56) References Cited

U.S. PATENT DOCUMENTS

| 7,962,342 | B1 | 6/2011 | Coughlan et al. |
| 9,620,128 | B2 | 4/2017 | Levien et al. |
| 9,918,183 | B2 | 3/2018 | Rhoads et al. |
| 10,388,277 | B1* | 8/2019 | Ghosh ................ G10L 15/1822 |
| 2003/0191648 | A1 | 10/2003 | Knott et al. |
| 2004/0190687 | A1 | 9/2004 | Baker |
| 2005/0049868 | A1 | 3/2005 | Busayapongchai |
| 2017/0270086 | A1* | 9/2017 | Fume ................... G06F 3/0488 |

FOREIGN PATENT DOCUMENTS

KR         100834679 B1    6/2008

* cited by examiner

*Primary Examiner* — Vu B Hang
(74) *Attorney, Agent, or Firm* — Banner & Witcoff, Ltd.

(57) ABSTRACT

Systems, apparatuses, and methods are described for assisting speech recognition processing. If speech recognition processing of speech input by an individual does not yield a recognized result, for example, if speech is from an individual with compromised speech, an indication may be sent to a device associated with another person that can assist. The other person may provide, via that device, additional input that indicates the meaning of the speech input. Based on this additional input, an assisted speech recognition result may be determined.

23 Claims, 8 Drawing Sheets

ASSISTED SPEECH RECOGNITION

BACKGROUND

A system performing speech recognition may receive an input comprising human speech and determine, using speech recognition software, words and meaning in that human speech. Speech recognition may be used for receiving commands and/or other input to a computer or other device. Although various algorithms can successfully recognize a wide variety of speech from a wide variety of users, some types of speech and/or speech generation or input conditions may impair and/or prevent accurate recognition. A failure to recognize and/or otherwise correctly process a speech input may cause frustration and/or other types of adverse user experience. These and other shortcomings are addressed in the disclosure.

SUMMARY

The following summary presents a simplified summary of certain features. The summary is not an extensive overview and is not intended to identify key or critical elements.

Systems, apparatuses, and methods are described for assisted speech recognition. In one aspect, an individual may provide speech input to a device. That speech input may request performance of an operation (e.g., output of a content item indicated in the speech input) via the device, or may request any other information or assistance. Speech recognition processing of the speech input may ultimately not deliver a correct interpretation of the speech. The incorrect interpretation may be due to a speech impediment of the speaker, or due to the speaker's medical or other condition affecting ability to speak. Based on that recognition failure, another user and/or another device may be determined to assist in recognizing the speech. The other user may, for example, be a family member, a medical professional or a person trained in speech recognition, or other person who is able to understand the individual's speech and provide assistance. The other user may be informed (e.g., via one or more communications causing output of a user interface via the other device) of the speech recognition failure and/or may be provided with audio associated with the speech input. The other user may provide, via a device, assistance that comprises input indicating the meaning of the speech input. Based on the assistance from the other user, an assisted speech recognition result may be determined for the speech input and the requested operation performed.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
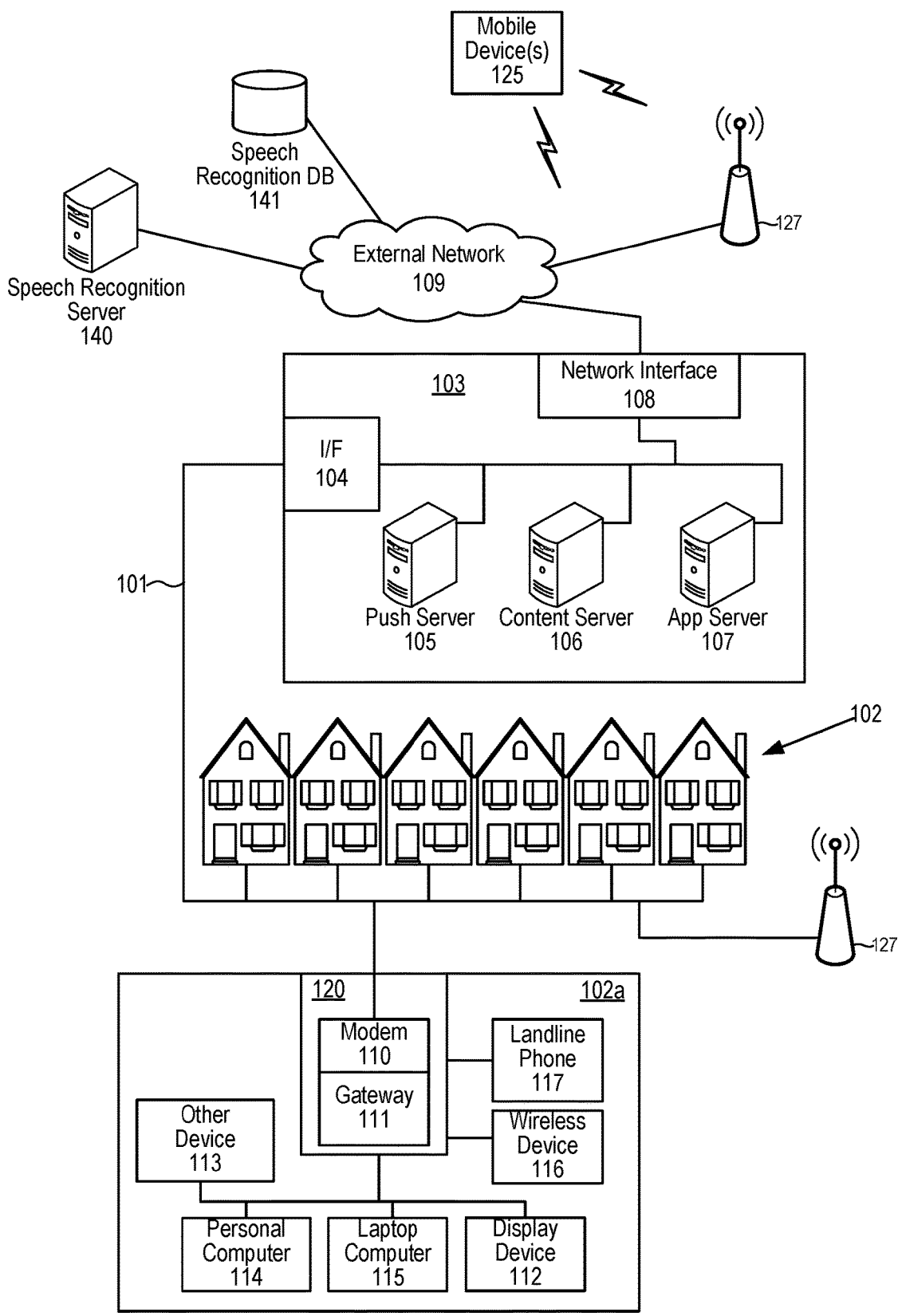
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

A computing device may perform audio recognition (e.g., by executing speech recognition software) to process audio inputs (e.g., from audio communications) that comprise spoken words. That processing may output speech recognition results which may comprise, for example, data indicating the spoken words. That data may be used as an input to one or more additional processes (e.g., algorithms performed by one or more software programs), may be sent to one or more other computing devices, and/or may be used for other purposes. For example, a computing device may accept speech recognition results as input commands to perform one or more operations such as selecting one or more content items, navigating content delivery schedules (e.g., program guides), searching for content items, selecting a content service, configuring a computing device, scheduling a recording of a content item, creating or recording text, and/or any other purpose.

Speech recognition algorithms may successfully recognize speech from a wide variety of users. However, some individuals may have speech-affecting conditions that may cause a failure of speech recognition processing. A speech recognition processing failure may comprise an inability to determine one or more (or any) spoken words in a portion of speech and/or an inaccurate determination of one or more spoken words in a portion of speech.

Speech-affecting conditions that disrupt automated speech recognition processing may take many forms. Some speech-affecting conditions may be related to one or more medical conditions. For example, a condition such as acquired apraxia of speech, verbal apraxia, dyspraxia, or other motor speech disorder may cause an individual to have difficulty speaking. Although an individual with one of these conditions may be able to create sounds for words, his or her speech may not be understandable to people unfamiliar with that individual's speech. Some speech-affecting conditions may be attributable to cultural and/or other considerations. For example, an individual may be speaking (or attempting to speak) a first language in which that individual is not proficient. That individual's speech may be heavily accented based on that individual's native second language, and may not be understandable to people unfamiliar with that individual's speech.

Automated speech recognition processing may fail (e.g., audio may not be recognized or otherwise understood) if performed on speech from an individual having a speech-affecting condition. Such an individual's speech may comprise one or more patterns, artifacts, tones, sounds, prosodic features, and/or other characteristics that are unique or relatively unique (e.g., not shared by a significant portion of the general population). For this and/or other reasons, speech recognition software used to process such speech may not be trained or otherwise configured to recognize (and/or otherwise understand) speech that includes characteristics of the individual's speech.

An individual having a speech-affecting condition may be associated with one or more persons who can understand that individual's speech. Those one or more persons may, for example, become familiar with the individual's speech as a result of time spent with that individual. Those one or more persons (e.g., family member(s), friend(s), business associate(s), medical personnel (e.g., therapist(s)), person(s) trained to recognize a particular speech, and/or other person(s)) may learn to recognize the meaning of the individual's speech and be able to understand what the individual is saying.

As explained in more detail herein, one or more computing devices may implement one or more methods to assist speech recognition processing for individuals having a speech-affecting condition. If speech recognition processing of speech input by such an individual fails (e.g., if audio cannot be recognized or otherwise understood), an associated person may be determined. That associated person, who may be able to understand the individual's speech, may be sent one or more messages associated with the failed speech recognition processing. Based on information in those one or more messages (e.g., audio for all or a portion of the speech input), the associated person may provide additional input that comprises or indicates the meaning of the speech input. Based on this additional input, data indicating meaning of the speech input may be sent to one or more computing devices and/or may cause performance of one or more operations that the individual was requesting via his or her speech input.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers in communication with other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (and/or an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as additional push, content, and/or application servers, and/or other types of servers. Also or alternatively, one or more servers may be part of the external network 109 and may be configured to communicate (e.g., via the local office 103) with computing devices located in or otherwise associated with one or more premises 102.

For example, a speech recognition server 140 may communicate with the local office 103 (and/or one or more other local offices), one or more premises 102, one or more access points 127, one or more mobiles devices 125, and/or one or more other computing devices via the external network 109. The speech recognition server 140 may perform speech recognition processing and/or other operations, as described below. Also or alternatively, the speech recognition server 140 may be located in the local office 103, in a premises 102, and/or elsewhere in a network. The speech recognition server 140 may communicate with a speech recognition database 141. The speech recognition database 141 may store libraries and/or other data that may be used in connection with speech recognition processing performed by the speech recognition server 140. For example, and as described below, separate libraries and/or other data may be maintained for use in performing speech recognition for audio input received from different sources (e.g., from devices associated with different users, premises, accounts, etc.). Although shown as a separate element, the speech recognition database 141 may be part of the speech recognition server 140. Also or alternatively, the push server 105, the content server 106, the application server 107, the speech recognition server 140, and/or other server(s) may be combined. The servers 105, 106, 107, and 140, other servers, and/or the speech recognition database 141 may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise (and/or otherwise perform operations of) a set-top box (STB), digital video recorder (DVR), a digital transport adapter (DTA), a computer server, a router, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, process, and/or otherwise use data associated with content items. A content item may comprise a video, a game, one or more images, software, audio, text, webpage(s), and/or other type of content. One or more types of data may be associated with a content item. A content item may, for example, be associated with media data (e.g., data encoding video, audio, and/or images) that may be processed to cause output of the content item via a display screen, a speaker, and/or other output device component.

Figure 2:
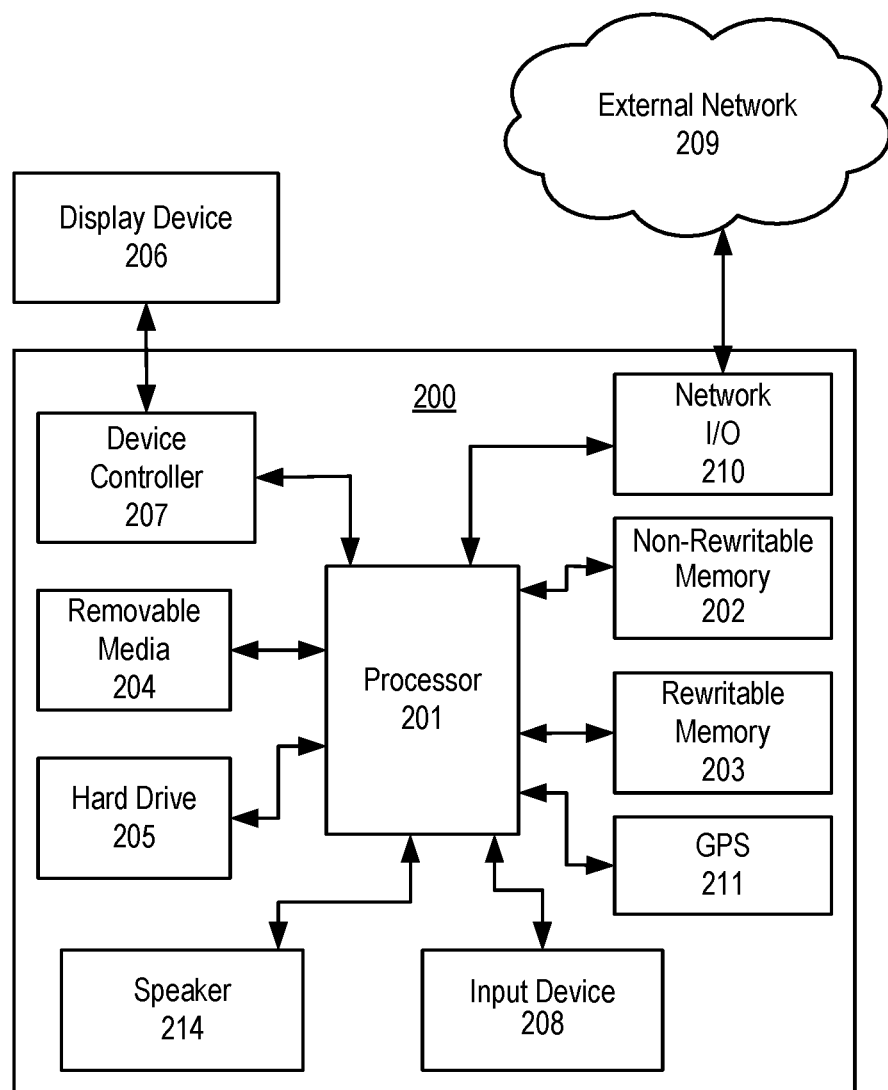
FIG. 2 shows example hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, the speech recognition server 140, the speech recognition database 141, any devices that are part of or associated with the external network 109) and any other computing devices discussed herein (e.g., a remote control unit associated with the gateway 111 and/or with another computing device). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output components, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), a microphone, etc. The computing device 200 may, for example receive sounds of speech input via a microphone. The processor 201 may (e.g., using one or more analog-to-digital (A/D) converters, digital signal processors (DSPs), and/or other components) digitize and/or otherwise generate audio data that is representative of the speech input. Also or alternatively, the computing device may comprise (e.g., in addition to the processor 201) one or more A/D converters, DSPs, and/or other components that generate audio data that is representative of the speech input. The processor 201 and/or other components of the computing device may send speech data to one or more other computing devices, may receive (e.g., via network input/output (I/O) interface 210, described below) speech data generated by another computing device, may perform speech recognition processing of speech data, and/or may perform other operations associated with speech data.

The computing device 200 may also comprise one or more network interfaces, such as the network I/O interface 210 (e.g., a network card), to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
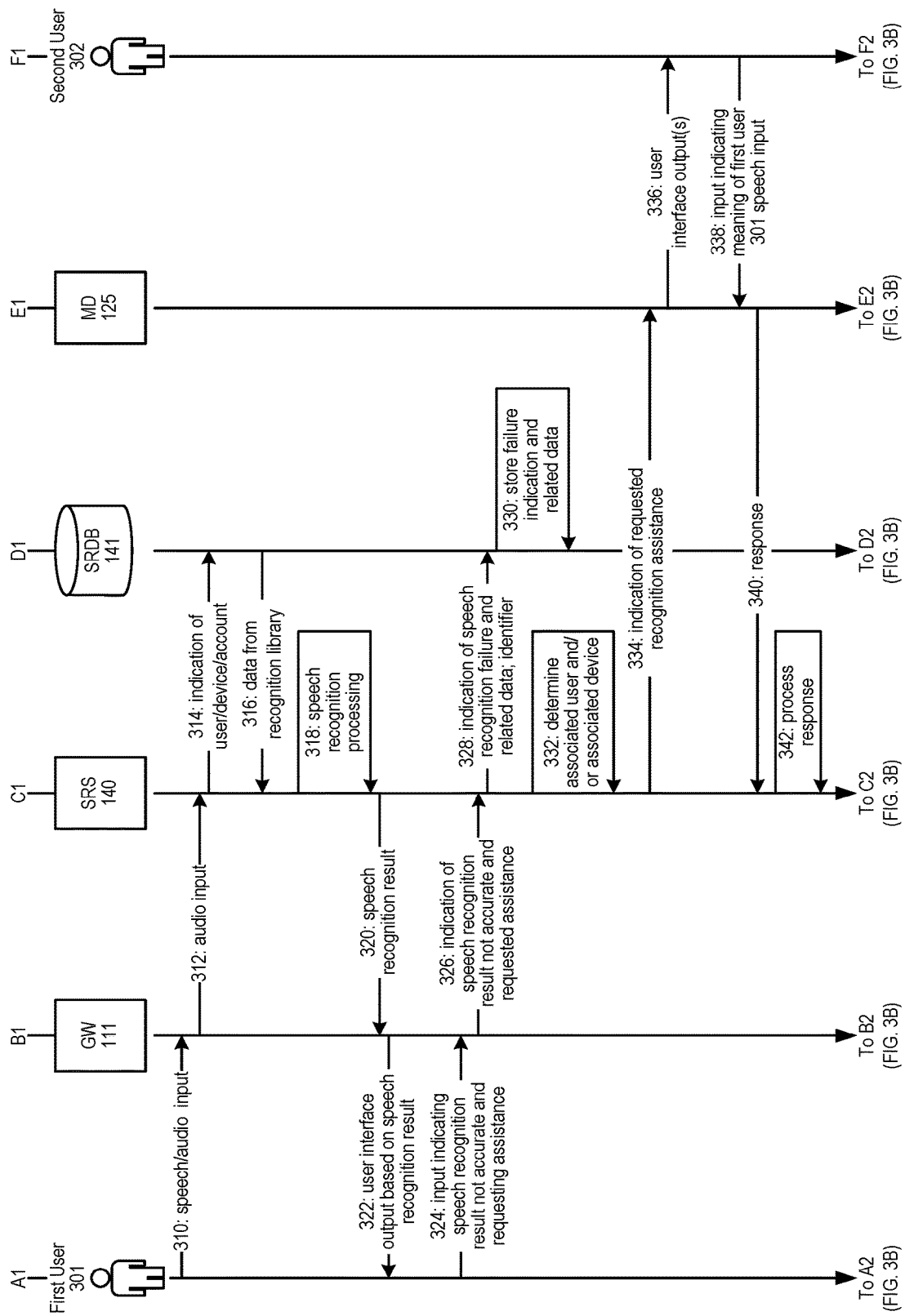
FIGS. 3A and 3B shows communications and/or steps in one or more example methods associated with assisted speech recognition.
Figure 3B:
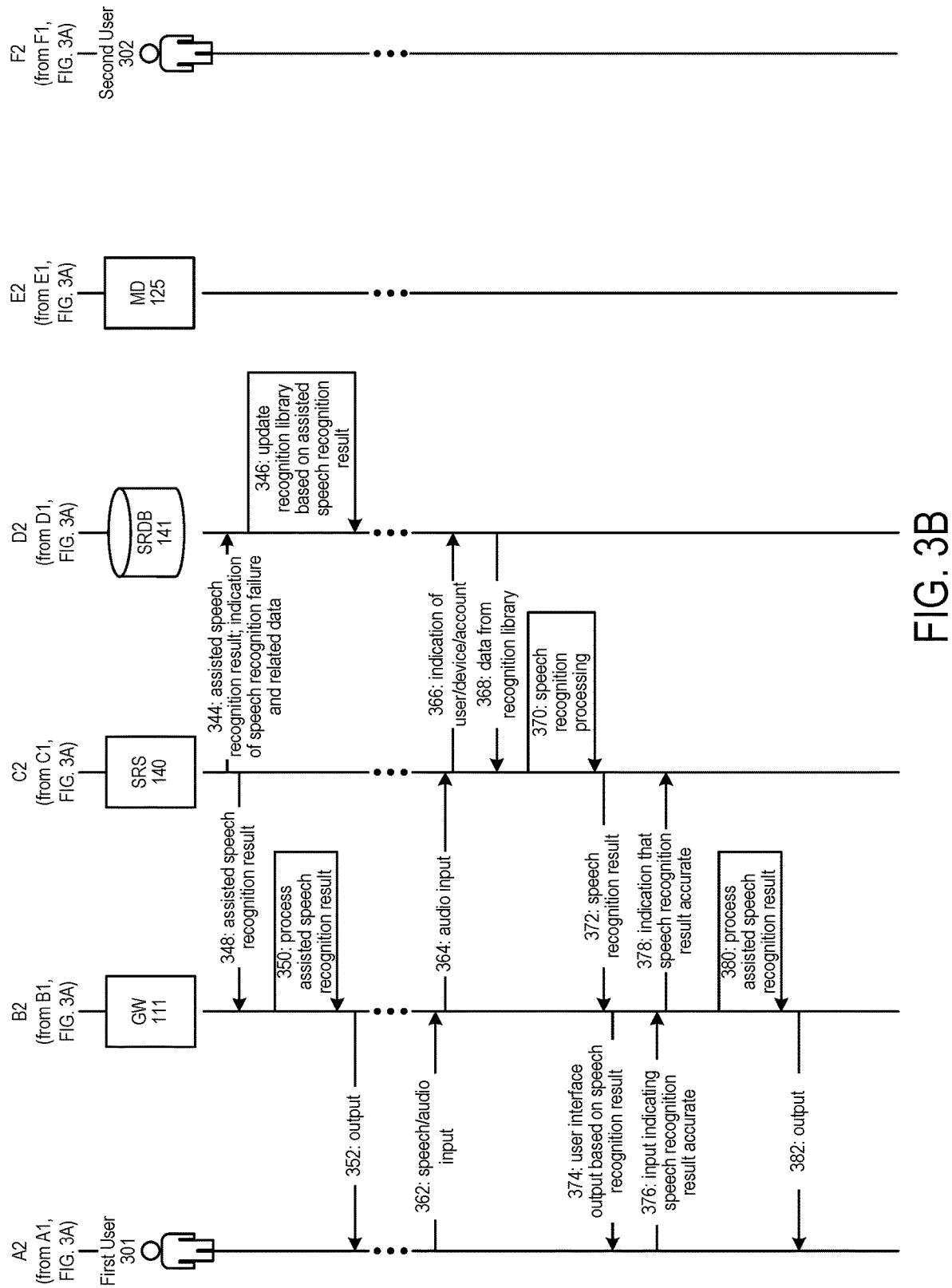

FIGS. 3A and 3B are a diagram showing communications and/or steps in one or more example methods associated with assisted speech recognition. FIG. 3B is a continuation of FIG. 3A, as indicated at the bottom of FIG. 3A and at the top of FIG. 3B. Although FIGS. 3A and 3B shows certain computing devices from FIG. 1 as examples of computing devices that may perform one of more of the steps described below, one, some, or all of those steps may be performed by one or more other computing devices. The devices shown in FIGS. 3A and 3B (and/or other computing devices) may be configured (e.g., based on stored instructions) to perform steps such as are described herein. One or more of the communications and/or steps shown in FIGS. 3A and 3B may be rearranged, omitted, and/or otherwise modified, and/or other steps and/or communications added. A communication shown in, and/or described in connection with, FIGS. 3A and 3B need not be a single message nor contained in a single packet, block, or other transmission unit.

A first user 301 of the gateway 111 (indicated as "GW" in FIGS. 3A and 3B) may be an individual having a speech-affecting condition and may be located in the premises 102*a* (FIG. 1). Vertical lines A1 (FIG. 3A) and A2 (FIG. 3B) correspond to the first user 301. Vertical lines B1 (FIG. 3A) and B2 (FIG. 3B) correspond to the gateway 111. As explained in connection with FIG. 1, the gateway 111 may communicate with other devices in the premises 102*a* (e.g., the display device 112). The gateway 111 may communicate with the speech recognition server 140 (indicated as "SRS" in FIGS. 3A and 3B, and hereinafter referred to as "server 140"). Vertical lines C1 (FIG. 3A) and C2 (FIG. 3B) correspond to the server 140. The server 140 may communicate with the speech recognition database 141 (indicated as "SRDB" in FIGS. 3A and 3B, and hereinafter referred to as "database 141"). Vertical lines D1 (FIG. 3A) and D2 (FIG. 3B) correspond to the database 141. The server 140 may communicate with the mobile device 125 (indicated as "MD" in FIG. 3). Vertical lines E1 (FIG. 3A) and E2 (FIG. 3B) correspond to the mobile device 125. The mobile device 125 may, for example, be located remotely from the premises 102*a*. A second user 302 of the mobile device 125 may be a person associated with the first user 301 and may be familiar with (and/or otherwise able to understand) the speech of the first user 301. Vertical lines F1 (FIG. 3A) and F2 (FIG. 3B) correspond to the second user 302.

The first user 301 may be using the gateway 111 and/or other device(s) that are in communication with the gateway 111. For example, the first user 301 may be consuming (e.g., watching and/or listening to) content that is output by the gateway 111 via another device (e.g., the display device 112). As part of using the gateway 111, the first user 301 may provide a speech input at step 310. That speech input may indicate a request for performance of one or more operations by the gateway 111. For example, the first user 301 may speak the name of a content item, the name of a content item service, or other words that, if recognized, may cause the gateway 111 to output content and/or other information associated with one or more content items. The first user 301 may provide the speech input of step 310 via another computing device (e.g., a remote control unit associated with the gateway 111, a mobile device in communication with the gateway 111, a home automation system, etc.). The computing device via which the first user 301 provides the speech input may convert the sound(s) of the first user 301 speech into an audio input in the form of data representing those sounds.

The gateway 111 may receive that audio input and may forward it to the server 140 in step 312. In step 314 the server 140 may send the database 141 an indication of a source associated with the audio input received in step 312. The indication may, for example, comprise information indicating a device (e.g., the gateway 111) from which the audio input was received, a user (e.g., the first user 301) associated with audio input, an account associated provision of data, content, and/or other services to the premises 102*a*, and/or other information indicating a source of the audio input. Based on the information sent in step 314, the database 141 may determine one or more libraries and/or other data associated with speech recognition of audio inputs received from the indicated source. In step 316, the database 141 may send some or all of the determined library(ies) and/or other data to the server 140.

In step 318, the server 140 may (e.g., using one or more speech recognition algorithms and the information received in step 316) perform speech recognition processing of the audio input received from the gateway 111 in step 312. That speech recognition processing may have several possible outcomes. As one possible outcome, the speech recognition processing may understand the audio input and may generate a speech recognition result that accurately reflects the speech input of the first user 301 (e.g., the server 140 is able to map the audio input to words that the first user 301 spoke). As another possible outcome, the speech recognition processing may fail to fully understand the audio input and may generate a speech recognition result that inaccurately reflects some or all of the speech input of the first user 301 (e.g., the server 140 is able to map the audio input to words, but some or all of those words may not be words actually spoken by the first user 301). As yet another possible outcome, the speech recognition processing may fail to fully understand the audio input and may be unable to generate a speech recognition result for some or all of the speech input of the first user 301 (e.g., the server 140 may be unable to map some or all of the audio input to words). The example of FIGS. 3A and 3B assumes a speech recognition result that inaccurately reflects the speech input of the first user 301 at step 310. Steps associated with the other possible outcomes are described in connection with FIGS. 3B, 6A and 6B.

Based on the processing of step 318, the server 140 may determine a speech recognition result. In step 320, the server 140 may send that speech recognition result to the gateway 111. In step 322, based on the speech recognition result received in step 320, the gateway 111 may cause output (e.g., via the display device 112 and/or another computing device) of a user interface that allows the first user 301 to determine further action.

Figure 4:
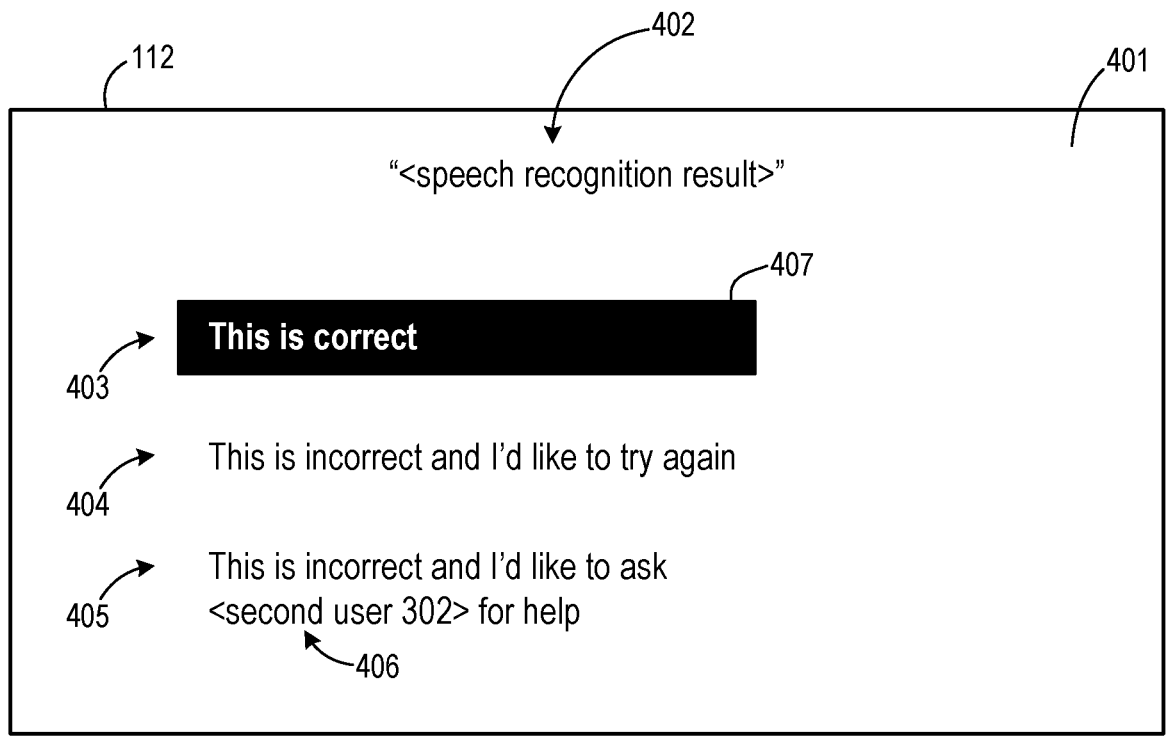
FIG. 4 shows an example user interface.

FIG. 4 shows an example of a user interface 401 that may be output as part of step 322. Although the example of FIG. 4 shows the user interface 401 output via the display device 112, the user interface 401 may be output via one or more other devices and/or may take a different form. The user interface 401 may comprise a region that displays text indicating the speech recognition result 402. The user interface may comprise additional regions that display text indicating options 403, 404, and 405, and a bar 407 may be manipulated (e.g., using up or down keys of a remote control unit) to highlight one of those options. The first user 301 may provide a further input (e.g., pressing a "select" or "enter" key of a remote control unit) to select the highlighted option. The option 403 may be selected to indicate that the speech recognition result 402 is correct. The option 404 may be selected to indicate that the speech recognition result 402 is incorrect, and that the first user 301 would like to try again (e.g., by re-speaking the input from step 310). The option 405 may be selected to indicate that the speech recognition result 402 is incorrect, and that the first user 301 would like to request assistance from the second user 302. The portion of the option 405 indicating the second user 302 may be generated based on configuration information associated with the gateway 111, as described below. Alternatively, the option 405 may not indicate a specific user who from whom help may be requested.

In the example of FIGS. 3A and 3B, the speech recognition result received in step 320 is not correct, and in step 324 the first user 301 may provide input selecting the option 405. In step 326, the gateway 111 may send, to the server 140, an indication that the speech recognition result was incorrect and that a user has requested assistance. In step 328, the server 140 may send an indication of a speech recognition failure to the database 141. In step 328, the server 140 may also send information to the database 141 that indicates one or more of: the audio input of step 312 for which speech recognition processing was performed in step 318, the source of that audio input (e.g., some or all of the information sent in step 314), libraries and/or other data used in the speech recognition processing of step 318 (e.g., information received in step 316), and/or other information associated with the speech recognition processing of step 318. The indication sent in step 328 may comprise a unique code, tag, or other identifier associated with the other information sent in step 328, which identifier may be used as described below. In step 330, the database 141 may store the information received in step 328. Also or alternatively, the database 141 may set a flag indicating that speech recognition processing for an audio input (the audio input of step 312) from a particular source (the source indicated in step 314) has failed.

In step 332, the server 140 may, based on the indication received in step 326, determine an associated user and/or associated device from whom assistance may be requested. The server 140 may perform step 332 by, for example, performing one or more look-ups. For example, one or more tables or other data structures (e.g., maintained by the server 140 and/or by one or more other computing devices) may store data that indicates one or more associated users that correspond to a source of an indication that speech recognition assistance is needed. That data may, for example, indicate one or more associated users that correspond to one or more of the first user 301, the gateway 111, a network address associated with the gateway 111, an account associated with providing services to the gateway 111 and/or with the premises 102a, etc. For each of the one or more associated users indicated by the one or more tables or other data structures, the stored data may indicate an associated user device and/or a network address and/or other information that may be used to send one or more communications to the associated user device. In the example of FIGS. 3A and 3B, the server 140 may in step 332 determine the second user 302 associated with the mobile device 125. The server 140 may further determine a network address (and/or other information) that may be used to direct a request for assistance to the mobile device 125.

Based on the associated user, associated device, and/or other information determined in step 332, the server 140 may, in step 334, send an indication to the mobile device 125. The indication sent in step 334 may comprise audio data (e.g., the audio input received in step 312) that may be used to generate a playback of the speech input by the first user 301. The indication sent in step 334 may further indicate that the assistance of the second user 302 is requested in connection with a speech input. Based on the indication received in step 334, the mobile device 125 may in step 336 generate a user interface to inform the second user 302 of the request for speech recognition assistance, and/or to provide the second user 302 with options for response.

Figure 5:
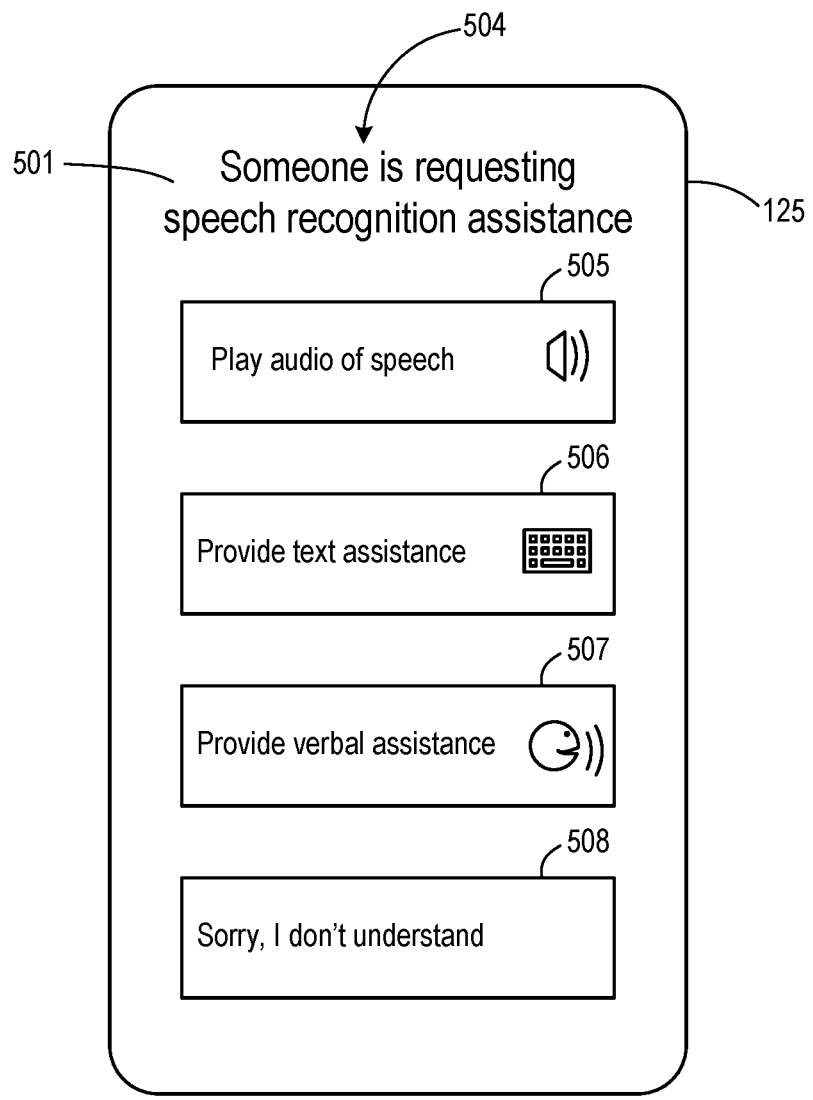
FIG. 5 shows another example user interface.

FIG. 5 shows an example of a user interface 501 that may be output in connection with step 336. Although the example of FIG. 5 assumes that the mobile device 125 is a smart phone and that the user interface 501 is output via a display of the mobile device 125, the user interface 501 may be output via one or more other devices and/or may take a different form. The user interface 501 may comprise text 504 indicating that speech recognition assistance is requested, as well as one or more selectable options. For example, an option 505 may be selectable (e.g., by touching a display region corresponding to the option 505) to cause output of audio (e.g., via an associated speaker, headphones, etc.) that comprises a playback of the speech input by the first user 301. An option 506 may be selectable (e.g., by touching a display region corresponding to the option 506) to cause presentation of a text input screen via which the second user 302 may input an indication of correct meaning of the speech input by the first user 301. An option 507 may be selectable (e.g., by touching a display region corresponding to the option 507) to allow the second user 302 to provide (e.g., via a microphone of the mobile device 125) a speech input indicating a correct meaning of the speech input by the first user 301 (e.g., a speech input that is a recognizable version of the speech input by the first user). An option 508 may be selectable (e.g., by touching a display region corresponding to the option 508) to allow the second user 302 to provide an input indicating that the second user 302 does not understand the speech input by the first user.

The output of the user interface 501 may be caused by the sending in step 334 of the indication of a request for recognition assistance, and/or by the sending of one or more other communications. For example, step 334 may comprise sending, to the mobile device 125, a text message, an email, or other type of message that comprises a link (e.g., a uniform resource locater (URL)). Upon selection of that URL, a browser of the mobile device 125 may be directed to a web page that comprises the user interface 501. Although not shown in FIG. 3, the server 140 may send a separate message (e.g., to a web server) that causes generation of that web page and/or association of that web page with the URL. The sending in step 334 may also or alternatively cause output of the user interface 501 in one or more other ways. For example, an application installed on the mobile device 125 may be dedicated to providing speech recognition assistance and may be left open/active on the mobile device 125. The step 334 may comprise sending one or more messages to that application to display the user interface 501 and/or to otherwise alert the second user 302 (e.g., by generating a sound) of the incoming request for assistance.

In step 338 (FIG. 3A), the second user 302 may provide an input (e.g., selecting one or more of the options 505-508). In the example of FIGS. 3A and 3B, that input may comprise a selection of option 505 and a selection of one of options 506 or 507. If option 507 is selected, the mobile device 125 may convert sounds of the speech input by the second user 302 into an audio input in the form of data representing those sounds. In step 340, the mobile device may send, to the server 140, a response based on the information received in step 334 and based on the input received in step 338. The response of step 340 may comprise text input by the second user 302 (e.g., if step 338 comprised selection of option 506) or audio data indicating a speech input by the second user 302 (e.g., if step 338 comprised selection of the option 507). The response of step 340 may comprise an indication, based on the input of the second user 302 explaining the speech input of the first user 301, of the operation requested by the speech input of the first user 301. For example, if the speech input of the first user 301 indicated one or more content items, the response of step 340 may indicate those one or more content items.

In step 342, the server 140 may process data received via the response 340 to determine an assisted speech recognition result. If that data comprises audio data indicating a speech input by the second user 302 (e.g., via the option 507), the processing of step 342 may comprise speech recognition processing of the audio data to determine a second speech recognition result based on words spoken by the second user 302, and designation of that second speech recognition result as the assisted speech recognition result. If that data comprised text input by the second user 302 (e.g., via the option 506), the processing may comprise designation of that text as the assisted speech recognition result. The processing of step 342 may further comprising determining if the assisted speech recognition result corresponds to a valid command or other input that the gateway 111 is configured to accept. For example, if the gateway 111 is configured to process user inputs associated with content consumption, the processing of 342 may comprise determining whether the assisted speech recognition result corresponds to a recognized content item, to a recognized content service, or to some recognized operation that the gateway 111 is configured to perform.

In the example of FIGS. 3A and 3B, the processing of step 342 may comprise a determination that the assisted speech recognition result corresponds to a valid input to the gateway 111. In step 344 (FIG. 3B), the server 140 may send an indication of the assisted speech recognition result to the database 141. The indication sent in step 344 may comprise the unique code, tag, or other identifier sent as part of step 328. Based on that identifier, the database 141 in step 346 may retrieve the information that was received in step 328 and stored in step 330. The database 141 may use the assisted speech recognition result and the original audio input (of step 312) to train (or further train) one or more speech recognition algorithms. That training may comprise generating information (e.g., updated and/or new libraries and/or other information) for use in connection with subsequent speech recognition processing. The database 141 may store that information with an indication that such information should be used in connection with speech recognition processing of audio inputs associated with a particular source (e.g., the source indicated by information received in step 328).

In step 348, the server 140 may send the assisted speech recognition result to the gateway 111. In step 350, the gateway 111 may process the assisted speech recognition result. For example, if the assisted speech recognition result is an instruction to output a particular content item, the gateway 111 may determine a content stream via which that content item may be received, may select that content stream and extract data associated with the content item, and/or may perform one or more other operations. In step 352, the gateway 111 may cause output based on the processing of step 350. That output may comprise, for example, output of audio and/or video of a content item (e.g., a content item indicated by the assisted speech recognition result) via the display 112 or other device.

Subsequently, and as shown at step 362, the first user 301 may provide the same input that was previously provided in step 310. The performance of step 362 may be the same as or similar to the performance of step 310. For example, the computing device via which the first user 301 provides the speech input of step 362 may convert the sound(s) of the first user 301 speech into an audio input in the form of data representing those sounds. In FIG. 3B, lines A2 through F2 include vertical ellipses to indicate that one or more other operations (e.g., associated with one or more other inputs from the first user 301) may occur between step 354 and step 362. Also or alternatively, the step 362 could follow the step 354 without any intervening steps being performed. The gateway 111 may receive the audio input associated with step 362 and may forward it to the server 140 in step 364. The performance of step 364 may be the same as or similar to the performance of step 312. In step 366, the server 140 may send the database 141 an indication of a source associated with the audio input received in step 364. The performance of step 366 may be the same as or similar to the performance of step 314.

Based on the information sent in step 366, the database 141 may determine one or more libraries and/or other data associated with speech recognition of audio inputs received from the source indicated by information received in step 366. The libraries and/or other data determined based on the information from step 366 may include the updated information generated in step 346. In step 368, the database 141 may send some or all of the determined library(ies) and/or other data to the server 140. In step 370, the server 140 may (e.g., using one or more speech recognition algorithms and the information received in step 368) perform speech recognition processing of the audio input received from the gateway 111 in step 364. Because the library(ies) and/or other data received from the database 141 in step 368 may be different from the library(ies) and/or other data received in step 316 (e.g., because of the updating of step 346), the outcome of step 370 may be different (e.g., more accurate) than the outcome of step 332.

In step 372, the server 140 may send the speech recognition result of step 370 to the gateway 111. In step 374, based on the speech recognition result received in step 372, the gateway 111 may cause output (e.g., via the display device 112 and/or another computing device) of a user interface (e.g., the user interface 401 of FIG. 4). In the example of FIGS. 3A and 3B, the speech recognition result received in step 372 is correct, and in step 376 the first user 301 may provide input selecting the option 403 (indicating the speech recognition result is correct). In step 378, the gateway 111 may send, to the server 140, an indication that the speech recognition result was correct. Although not shown, the server 140 may send an indication of the correct result to the database 141 (e.g., for further updating to confirm successful speech recognition using the information sent in step 368). In step 380, the gateway 111 may, based on the indication of accurate recognition received in step 376, process the speech recognition result received in step 372. The processing of step 380 may be similar to that of step 350. In step 382, the gateway 111 may cause output based on the processing of step 380. That output may be similar to that of step 352.

Figure 6A:
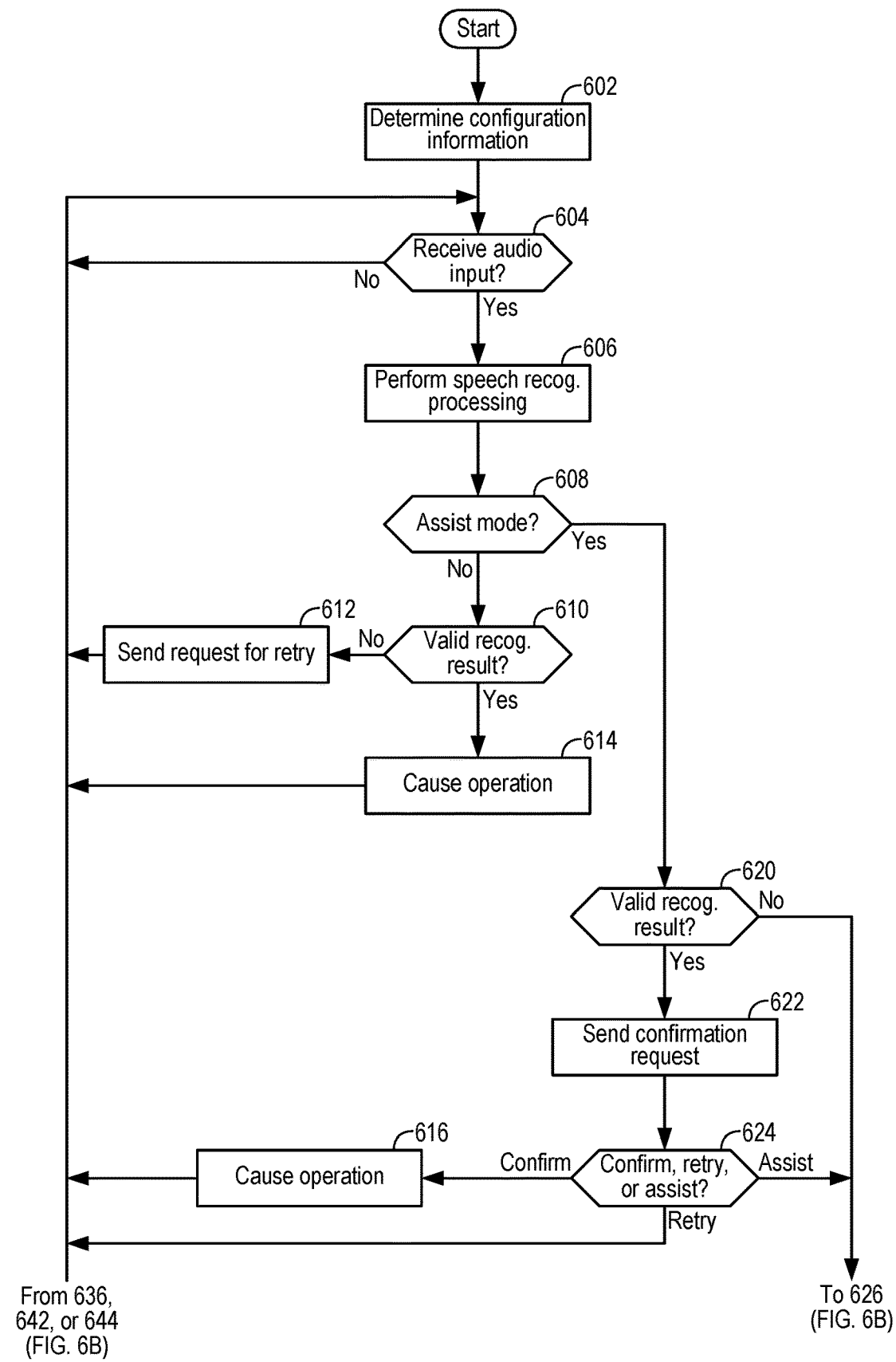
FIGS. 6A and 6B are a flow chart showing steps of an example method associated with assisted speech recognition.
Figure 6B:
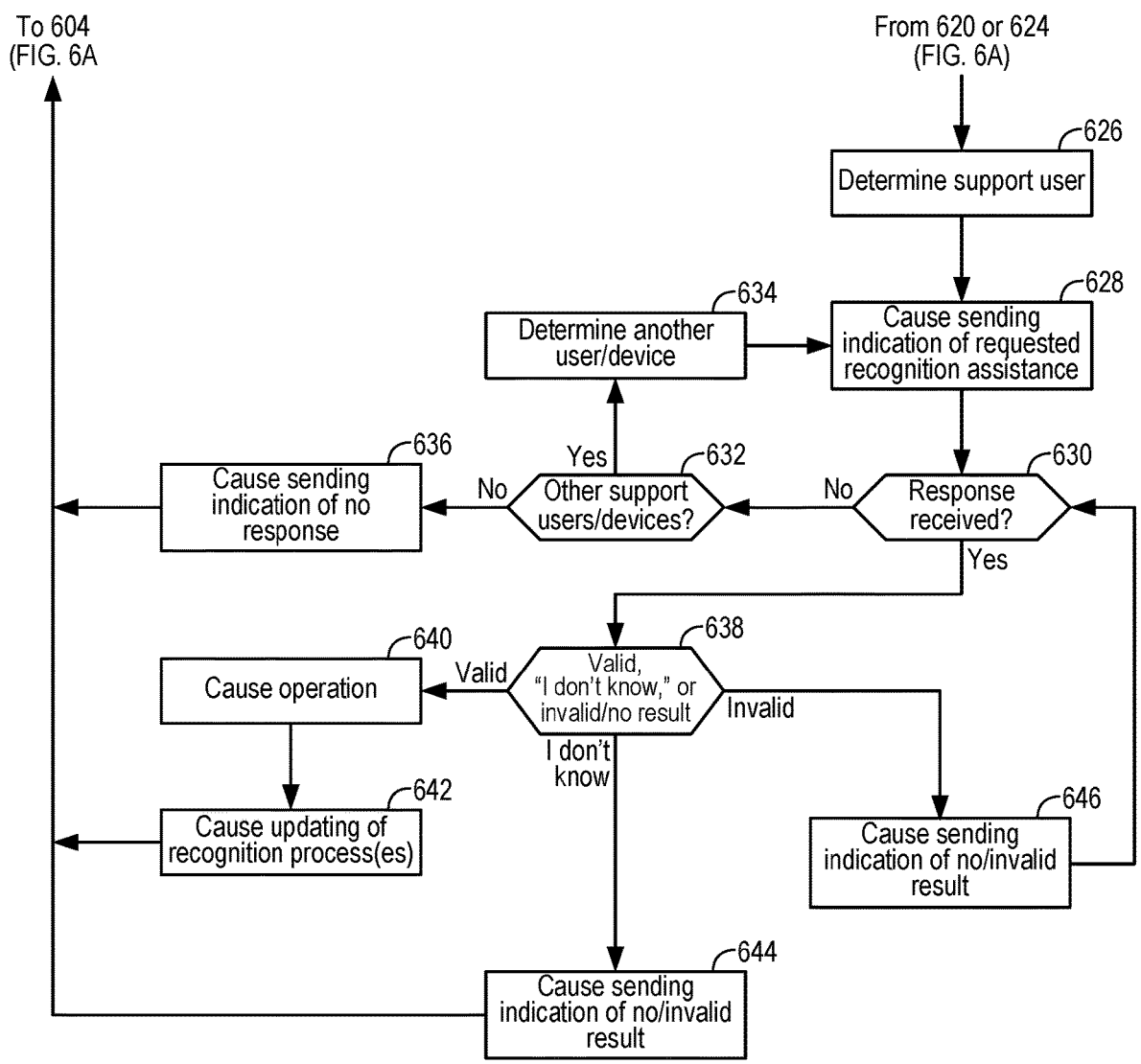

FIGS. 6A and 6B are a flow chart showing steps of an example method associated with assisted speech recognition. One, some, or all steps of the example method of FIGS. 6A and 6B may be performed by the server 140, and for convenience FIGS. 6A and 6B will be described below in connection with the server 140. Also or alternatively, one, some, or all steps of the example method of FIGS. 6A and 6B may be performed by one or more other computing devices. One or more steps of the example method of FIGS. 6A and 6B, and/or one or more communications described in connection with the method of FIGS. 6A and 6B, may be rearranged (e.g., performed, sent, or received in a different order), omitted, and/or otherwise modified, and/or other steps and/or communications added. A communication described in connection with the example method of FIGS. 6A and 6B need not be a single message nor contained in a single packet, block, or other transmission unit.

In step 602, the server 140 may determine (e.g., by receiving via user input) and store configuration information. The configuration information may comprise data that indicates one or more users and/or devices that should be associated with a source of audio inputs. The configuration information may indicate a source of audio inputs with one or more of: data identifying one or more devices from which audio inputs may be received, data indicating one or more network addresses from which audio inputs may be received, data indicating one or more users from which audio inputs may be received, data indicating one or more premises from which audio inputs may be received, data indicating one or more accounts (e.g., for provision of data and/or content delivery services) associated with devices, users, and/or premises from which audio inputs may be received, and/or other type(s) of data. The configuration information may indicate multiple users and/or multiple devices that should be associated with a source of audio inputs. For example, and as described below, multiple associated users and/or devices may be designated for contacting if speech recognition assistance is requested. If a first of such multiple users and/or devices is not available or does not respond to a request for speech recognition assistance, a request for speech recognition assistance may be sent to a second of those multiple users and/or devices. The configuration information may comprise, for each user and/or device associated with a source of audio inputs, one or more network addresses and/or other information that may be used to send a request for speech recognition assistance to the user and/or device.

In step 604, the server 104 may determine if it has received an audio input for which speech recognition processing should be performed. If no, step 604 may be repeated. If yes (e.g., based on occurrence of a step such as step 312 or step 362 of the example of FIGS. 3A and 3B), step 606 may be performed. In step 606, which may be comprised by step 318 or 380 of the example of FIGS. 3A and 3B, the server 140 may perform speech recognition processing on the audio input determined in step 604 to have been received. For convenience, that audio input is referred to as the "pending audio input" in the remainder of the description of FIGS. 6A and 6B. The pending audio input may comprise a request by a user (e.g., the first user 301 in the example of FIGS. 3A and 3B) for performance of an operation by a device associated with the pending audio input (e.g., the gateway 111 in the example of FIGS. 3A and 3B). For example, that user may have requested, via speech input to the device, output of one or more content items, and the audio input may comprise audio data generated based on that speech input.

As part of step 606, or as additional steps prior to step 606, the server 140 may perform steps such as steps 314 and 316 (or steps 366 and 368). For example, the server 140 may determine the source of the pending audio input and/or may determine if there is data (e.g., a specific training library or other collection of data to be used in connection with speech recognition processing) that is specific to the source of the pending audio input. If there is such data specific to the source of the pending audio input, the server 140 may use that data in connection with the speech recognition processing of step 606. Also or alternatively, the server 140 may perform the speech recognition processing of step 606 using data applicable to multiple sources of audio inputs.

In step 608, the server 140 may determine if a device from which the pending audio input was received is being operated in a mode associated with assisted speech recognition. For example, the gateway 111 (or other device) may be operable in multiple speech recognition configurations. In a first configuration (e.g., a non-assist mode), assistance may not be requested if there is a speech recognition failure. In a second configuration (e.g., an assist mode), assistance may be requested if there is a speech recognition failure. The availability of multiple modes may, for example, minimize unnecessary use of network resources to send unnecessary or unwanted requests for assistance. A mode may be selectable at the time of providing a speech input (e.g., by pressing an additional button on a remote control unit when speaking that input) and may only apply for that speech input. For example, a non-assist mode may be set by default, and an assist mode may be selectable for a single speech input. Alternatively, an assist mode may be set by default, and a non-assist mode may be selectable for a single speech input. A default mode may be selectable, for example, via a configuration user interface output by the gateway 111 and/or by another device. The server 140 may perform the determination of step 608 based on a flag or other indicator in a message associated with the pending audio input and/or in other data associated with a source of the pending audio input.

If the server 140 determines in step 608 that an assist mode is not active, step 610 may be performed. In step 610, the server 140 may determine if the speech recognition processing of step 606 yielded a result, and whether that result corresponds to a valid command or other input for a device associated with pending audio input. As indicated above, speech recognition processing may have several possible outcomes. If the server 140 was unable to generate a recognition result in step 606 for some or all of the pending audio input, or if the server 140 was able to generate a recognition result but that recognition result does not correspond to a valid command or other input, step 612 may be performed. In step 612, the server may cause (e.g., by sending one or more messages) output (e.g., via the gateway 111 or other device associated with the pending audio input) of a message indicating a speech recognition failure and asking a user to try again. If the server 140 determines in step 610 that the processing of step 606 yielded a result that corresponds to a valid command or other input, step 614 may be performed. In step 614, the server 140 may cause (e.g., by sending a message indicating the speech recognition result from step 606) the gateway 111 or other device to perform an operation (e.g., outputting requested content) associated with the speech recognition result. After step 612 or step 614, step 604 may be repeated.

If the server 140 determines in step 608 that an assist mode is active, step 620 may be performed. Step 620, which may be comprised by step 318 or step 370 of the example of FIGS. 3A and 3B, may be the same as or similar to step 610. If the server 140 determines in step 620 that the processing of step 606 yielded a result that corresponds to a valid command or other input, step 622 may be performed. In step 622, the server 140 may cause an indication of the speech recognition result to be sent, to a device associated with the pending audio input, for confirmation. Step 622 may be comprised by step 320 or step 372 in the example of FIGS. 3A and 3B. In step 624, the server 140 may determine what type response to the request of step 622 was received. If the response indicates that the speech recognition result was correct (e.g., if the option 403 of the user interface 401 was selected), step 616 may be performed. In step 616, gateway 111 or other device may be caused to perform an operation (e.g., outputting requested content) associated with the speech recognition result. Step 616 may comprise the server 140 sending a further message to the gateway 111 to proceed with the operation associated with the recognition result. Also or alternatively (e.g., as shown in connection with step 380), the gateway 111 or other device may perform that operation after receiving a user input indicating an accurate speech recognition result, and without further communication from the server 140.

If the response to the request of step 622 indicates that the speech recognition result was incorrect but that a user would like to try again (e.g., if the option 404 of the user interface 401 was selected), step 604 may be repeated. If the response indicates that the speech recognition result was not correct and the user wishes to obtain assistance (e.g., if the option 405 of the user interface 401 was selected and/or the response to the request of step 622 comprises an indication such as the indication of step 326 of the example of FIGS. 3A and 3B), step 626 (FIG. 6B) may be performed. Step 626 may alternatively be performed if the server 140 determines in step 620 that a valid recognition result was not generated in step 606. A "no" determination in step 608 or step 624 may comprise a determination of a failure of the speech recognition processing of step 606 (e.g., a determination that the pending audio input was not understood).

In step 626, the server 140 may determine, based on the configuration information determined in step 602, a user and/or device associated with a source of the pending audio input. Step 626 may be comprised by step 332 of the example of FIGS. 3A and 3B. If the configuration information indicated multiple users and/or devices associated with the source of the pending audio input, the server 140 may select a first of the multiple users and/or devices (e.g., based on a ranking, priority, or other parameter assigned during input of configuration information). In step 628 (which may be comprised by step 334 in the example of FIGS. 3A and 3B), the server 140 may cause sending, to a device determined in step 626, of an indication that speech recognition assistance is requested. The indication may comprise audio data (e.g., the pending audio input) and/or other information indicating that assistance is requested, and/or may be configured to cause a device (e.g., the mobile device 125) to output a user interface (e.g., the user interface 501).

In step 630, the server 140 may determine if a response was received to the indication sent as part of step 628. If not (e.g., if a response time-out period has expired), the server 140 may in step 632 determine (e.g., based on the configuration information determined in step 602) if there are other users and/or devices to which an indication of requested speech recognition assistance may be sent. If yes, another user and/or device may be determined in step 634, and step 628 may be repeated for a device determined in step 634. If the server 140 determines in step 632 that there are no other users and/or devices to which an indication of requested speech recognition assistance may be sent, step 636 may be performed. In step 636, the server 140 may cause sending, to a device associated with the pending audio input, of an indication that speech recognition assistance is not currently available. After step 636, step 604 may be repeated.

If the server 140 determines in step 630 that a response has been received, step 638 may be performed. In step 638, which may be comprised by step 342 in the example of FIGS. 3A and 3B, the server 140 may determine if there is a valid assisted speech recognition result. For example, text received in the response (e.g., based on text provided after selection of the option 506 in the user interface 501) may be determined to be a valid assisted speech recognition result if that text corresponds to a valid command or other input to a device associated with the pending audio input. Also or alternatively, a speech recognition result generated based on a second audio input received in the response (e.g., based on speech input provided after selection of the option 507 in the user interface 501) may be determined to be a valid assisted speech recognition result if that result corresponds to a valid command or other input to the device associated with the pending audio input. If a valid assisted speech recognition result is determined, step 640 may be performed. In step 640, the server 140 may cause the gateway 111 (or other device associated with the pending audio input) to perform an operation (e.g., outputting requested content) associated with the assisted speech recognition result. Step 640 may comprise sending the assisted speech recognition result to the gateway 111 (or other device associated with the pending audio input), for example, as described in connection with step 348 of the example of FIGS. 3A and 3B. After step 640, the server 140 may in step 642 cause updating of one or more speech recognition algorithms based on the assisted speech recognition result and the pending audio input. The updating of step 642 may be comprised by step 344 and/or step 346 in the example of FIGS. 3A and 3B. After step 642, the server 140 may repeat step 604.

If the server 140 determines in step 638 that an associated user does not know what the speech associated with pending audio input means or is otherwise unable to provide assistance (e.g., if the option 508 was selected in the user interface 501), step 644 may be performed. In step 644, the server 140 may cause sending, to the gateway 111 or other device associated with the pending audio input, of an indication that the associated user does not understand the speech input or is otherwise unable to provide assistance. After step 644, the server 140 may repeat step 604.

If the server 140 determines in step 638 that the response from the associated user comprises second audio data (e.g., based on speech input provided after selection of the option 507 in the user interface 501) for which a successful speech recognition result cannot be generated, that the response from the associated user comprises second audio data for which a successful speech recognition result can be generated, but which does not correspond to a valid command or input, or that the response comprises text that does not correspond to a valid command or input, step 646 may be performed. In step 646, the server 140 may cause sending, to a device from which the response was received, of an indication that the response was not valid and/or could not be processed, and inviting the associated user to try again. After step 646, step 630 may be repeated.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, for audio recognition processing, a first audio communication from a first user, wherein the first audio communication comprises a request for performance of an operation by a first device;
   determining that the first audio communication cannot be recognized;
   receiving, based on the determining that the first audio communication cannot be recognized, an indication that the first user requests audio recognition assistance;
   sending, based on the receiving the indication that the first user requests audio recognition assistance, a message comprising at least a portion of the first audio communication to a second device associated with a second user, wherein the second user is associated with recognizing audio from the first user; and
   receiving, from the second device, a second audio communication that comprises a recognizable version of the first audio communication.

2. The method of claim 1, wherein the operation comprises output of one or more content items, the method further comprising:
   causing, based on the received second audio communication, the first device to perform the operation.

3. The method of claim 1, further comprising:
   updating, based on the received second audio communication and the first audio communication, data used to perform speech recognition processing of the first audio communication.

4. The method of claim 1, wherein the message causes the second device to output a user interface for providing an indication of the operation.

5. The method of claim 1, further comprising:
   determining, based on the determining that the first audio communication cannot be recognized and on data indicating one or more computing devices associated with a source of the first audio communication, the second device.

6. The method of claim 1, wherein the message further comprises an indication that assistance of the second user is requested for the first audio communication.

7. The method of claim 1, wherein the first device is located in a premises and the second device is located remote from the premises.

8. The method of claim 1, further comprising:
   determining, before the sending of the message to the second device, a speech recognition assistance mode associated with the first device.

9. The method of claim 1, further comprising:
   performing speech recognition processing of the second audio communication; and
   determining that a result, of the speech recognition processing of the second audio communication, corresponds to a valid input to the first device.

10. A method comprising:
    determining, by a computing device, that an audio communication associated with a request for output of one or more content items cannot be recognized;
    receiving, by the computing device and from a source of the audio communication, a first indication that audio recognition assistance is requested;
    determining, based on the receiving the first indication that audio recognition assistance is requested, on the determining that the audio communication cannot be recognized, and on data indicating one or more other computing devices associated with the source of the audio communication, a second computing device;
    causing sending of the audio communication to the determined second computing device;
    receiving, from the second computing device, a second indication of the one or more content items; and
    causing, based on the received second indication, output of the one or more content items.

11. The method of claim 10, further comprising:
    updating, based on the received second indication and the audio communication, data used to perform speech recognition processing of the audio communication.

12. The method of claim 10, wherein the causing sending of the audio communication comprises causing the second computing device to output a user interface for providing the second indication of the one or more content items.

13. The method of claim 10, wherein the causing sending of the audio communication further comprises causing sending of an indication that assistance of the determined second computing device is requested for the audio communication.

14. The method of claim 10, wherein the received second indication comprises a second audio communication, the method further comprising:
    performing speech recognition processing of the second audio communication; and
    determining that a result, of the speech recognition processing of the second audio communication, corresponds to a valid input to a device associated with the audio communication.

15. The method of claim 10, further comprising:
    determining, before the causing the sending of the audio communication to the second computing device, a speech recognition assistance mode associated with the audio communication.

16. A method comprising:
receiving, for speech recognition processing, an audio communication comprising a request, by a first user, for performance of an operation by a first device;
determining that the audio communication cannot be recognized;
receiving, based on the determining that the audio communication cannot be recognized, an indication that the first user requests audio recognition assistance;
based on the indication that the first user requests audio recognition assistance and the determining that the audio communication cannot be recognized, causing output, via a second device associated with a second user, of a user interface for providing additional information about the audio communication;
receiving, from the second device, the additional information; and
causing, based on the received additional information, performance of the operation.

17. The method of claim 16, wherein the operation comprises output of one or more content items.

18. The method of claim 16, further comprising:
updating, based on the received additional information and the audio communication, data used to perform speech recognition processing of the audio communication.

19. The method of claim 16, further comprising:
determining, based on the determining that the audio communication cannot be recognized and on data indicating one or more computing devices associated with a source of the audio communication, the second device.

20. The method of claim 16, further comprising:
determining, before the causing the output of the user interface, a speech recognition assistance mode associated with the first device.

21. The method of claim 1, further comprising:
determining, based on the first audio communication from the first user, an audio recognition result;
causing output, via a user interface, of text indicating the audio recognition result; and
causing output, via the user interface, of at least one option selectable by the first user that indicates that the the audio recognition result is incorrect and that the first user requests audio recognition assistance from the second user.

22. The method of claim 1, further comprising:
storing data indicating users that are able to understand speech of the first user; and
determining, based on the data indicating users that are able to understand speech of the first user, the second user.

23. The method of claim 1, wherein the second user comprises at least one of: a family member, a medical professional, or a person trained in speech recognition.

* * * * *

UNITED STATES PATENT AND TRADEMARK OFFICE
CERTIFICATE OF CORRECTION

PATENT NO. : 11,810,573 B2  
APPLICATION NO. : 17/239349  
DATED : November 7, 2023  
INVENTOR(S) : Daniel Loftus Page 1 of 1

It is certified that error appears in the above-identified patent and that said Letters Patent is hereby corrected as shown below:

In the Specification

Column 14, Line 4:
Delete "104" and insert --140--

In the Claims

Column 20, Claim 21, Line 16:
Before "audio", delete "the"

Signed and Sealed this  
Seventh Day of January, 2025

Derrick Brent  
*Acting Director of the United States Patent and Trademark Office*